United States Patent
Renollett et al.

(10) Patent No.: US 10,240,623 B2
(45) Date of Patent: Mar. 26, 2019

(54) LOCKING MECHANISM AND METHOD FOR AN ELECTRO-PNEUMATIC CONTROLLER

(71) Applicant: TESCOM CORPORATION, Elk River, MN (US)

(72) Inventors: Jacob T. R. Renollett, Andover, MN (US); Eric J. Burgett, McKinney, TX (US)

(73) Assignee: TESCOM CORPORATION, Elk River, MN (US)

( * ) Notice: Subject to any disclaimer, the term of this patent is extended or adjusted under 35 U.S.C. 154(b) by 151 days.

(21) Appl. No.: 15/187,455

(22) Filed: Jun. 20, 2016

(65) Prior Publication Data

US 2016/0377104 A1     Dec. 29, 2016

Related U.S. Application Data

(60) Provisional application No. 62/184,542, filed on Jun. 25, 2015.

(51) Int. Cl.
| | |
|---|---|
| *F16K 35/00* | (2006.01) |
| *F16B 5/02* | (2006.01) |
| *F16K 35/10* | (2006.01) |
| *F16K 27/12* | (2006.01) |
| *F16K 31/04* | (2006.01) |

(Continued)

(52) U.S. Cl.
CPC ............ *F16B 5/025* (2013.01); *F16B 35/005* (2013.01); *F16K 27/12* (2013.01); *F16K 31/04* (2013.01); *F16K 35/10* (2013.01); *G05D 16/20* (2013.01); *Y10T 137/7256* (2015.04); *Y10T 137/7761* (2015.04)

(58) Field of Classification Search
CPC .................... Y10T 137/7256; Y10T 137/7761
See application file for complete search history.

(56) References Cited

U.S. PATENT DOCUMENTS

| | | | |
|---|---|---|---|
| 3,094,136 A * | 6/1963 | Bredtschneider | ....... F16K 5/222 137/246.11 |
| 4,452,424 A | 6/1984 | Kawata | |
| 4,535,815 A | 8/1985 | Ohumi et al. | |

(Continued)

OTHER PUBLICATIONS

International Search Report and Written Opinion, corresponding to International Application No. PCT/US2016/039160, dated Sep. 21, 2016.

(Continued)

*Primary Examiner* — Robert K Arundale
(74) *Attorney, Agent, or Firm* — Marshall, Gerstein & Borun LLP

(57) ABSTRACT

An electro-pneumatic controller for use with a regulator. The electro-pneumatic controller includes a base having a body, a top surface, and a bore formed within the body. A locking mechanism is disposed within the bore of the body of the base, the locking mechanism having a top surface flush with the top surface of the base. A cover is coupled to the base and includes an open end with a rim, the rim contacting the top surface of the base and a portion of the top surface of the locking mechanism. The locking mechanism is rotated via a tool in a counter-clockwise direction after the cover contacts a portion of the top surface of the locking mechanism to lock the cover to the base.

19 Claims, 8 Drawing Sheets

(51) Int. Cl.
*F16B 35/00* (2006.01)
*G05D 16/20* (2006.01)

(56) References Cited

U.S. PATENT DOCUMENTS 5,213,308 A * 5/1993 Jeromson ................ F16K 35/04
137/385
2015/0027563 A1 * 1/2015 Barton .................. F16K 5/0407
137/385

OTHER PUBLICATIONS

TESCOM ER5000 Series Electropneumatic Controllers/Motors, Sep. 2014, pp. 1-12, DER502060X012, © 2014 Emerson Process Management, USA.
ROSEMOUNT 3051 Pressure Transmitter, Product Data Sheet, Sep. 2014, 00813-0101-4001, Rev SA, pp. 1-84, © Rosemount, Emerson Process Management, USA.

* cited by examiner

LOCKING MECHANISM AND METHOD FOR AN ELECTRO-PNEUMATIC CONTROLLER

FIELD OF THE DISCLOSURE

The present invention relates generally to controllers for a process control valve, and, more specifically, to a cover lock for an electro-pneumatic controller.

BACKGROUND OF THE DISCLOSURE

Electro-pneumatic controllers (also called electro-pneumatic regulators) are typically used to control the pressure of control fluid used to position a pneumatically-controlled device, such as a regulator. For example, an electro-pneumatic controller can be used to control the pressure of control fluid into a pneumatic actuator of a process control valve or regulator to position the process control valve or regulator. The electro-pneumatic controllers may include one or more passageways to receive the control fluid, and one or more solenoid valves may control the flow of the control fluid through the passageways. The one or more solenoid valves may be in communication with a microprocessor, which may be in communication with one or more sensors disposed outside of the electro-pneumatic controller to control the electro-pneumatic controller and/or the process control valve or regulator. The one or more passageways, one or more solenoid valves, and the microprocessor may all be disposed within a housing that includes a base and a cover.

Locking devices are required on many process control system parts, such as electro-pneumatic controllers, to ensure circuitry, the one or more valves, and other components are properly locked in an enclosure, for example. In this way, an operator and/or user cannot unknowingly and/or inadvertently tamper with an unlocked enclosure and risk damage to the system and/or injury.

In one example, and as depicted in FIG. 1, a conventional electro-pneumatic controller 10 includes a locking assembly 12. More specifically, the electro-pneumatic controller 10 includes a base 14 and a cover 16 disposed on the base 14, and the locking assembly 12 locks the cover 16 to the base 12. The locking assembly 12 is a multi-part assembly that includes a body 20, a guide pin 22, and a bolt 24. To install the locking assembly 12 onto the electro-pneumatic controller 10, the body 20 is first disposed on a top surface of the base 14. In addition, the rear end 26 of the body 20 is aligned with an indentation 28 disposed on an outside surface of the cover 16. The guide pin 22 is then inserted into an aperture 30 disposed on a top portion of the body 20 of the locking assembly 12 until a leading end of the guide pin 22 lines up with and contacts a hole (not shown) in the top surface of the base 14. The bolt 24 is then inserted into the body 20 and rotated in a clockwise direction, in one example, via a tool until a leading end of the bolt 24 contacts the top portion of the base 14. When the bolt 24 contacts the top portion of the base 14, the rear end 26 of the body 20 is press-fit and/or further pushed into contact with the indentation 28 of the cover 16, effectively locking the cover 16 to the base 14.

The locking assembly 16, however, is bulky and can be cumbersome to install because of its three-part configuration, e.g., the body 20, the pin 22, and the screw 24, and required alignment of the body 20 with the indentation 28 of the cover 16 before insertion of the guide pin 22, for example. In addition, because there are three parts to the locking assembly 16, there is an increased risk of error in installing each of the parts, increasing the possibility of an ineffective lock, and ultimately damage and/or injury.

SUMMARY OF THE DISCLOSURE

In accordance with a first exemplary aspect of the disclosure, an electro-pneumatic controller for use with a regulator includes a base having a body, a top surface, and a bore formed within the body. A locking mechanism is disposed within the bore of the base and includes a top surface flush with the top surface of the base. A cover is coupled to the base and has an open end with a rim. The rim contacts the top surface of the base and a portion of the top surface of the locking mechanism. The locking mechanism is arranged to rotate in a counter-clockwise direction after the cover contacts a portion of the top surface of the locking mechanism to lock the cover to the base.

According to another exemplary aspect of the present disclosure, a process control system includes a regulator having a housing with a top portion and an electro-pneumatic controller having an outlet port operatively coupled to the top portion of the regulator housing. The electro-pneumatic controller maintains a setpoint pressure within the regulator and includes a base having a body, a top surface, a bottom surface, and a bore formed within the body, with the outlet port formed in the bottom surface of the base. A locking mechanism is disposed within the bore of the base and has a top surface flush with the top surface of the base. A cover is coupled to the base and has an open end with a rim, which contacts the top surface of the base and a portion of the top surface of the locking mechanism. The locking mechanism is arranged to rotate upwardly in a counter-clockwise direction after the cover contacts a portion of the top surface of the locking mechanism to lock the cover to the base.

According to a further exemplary aspect of the present disclosure, a method for locking a cover of an electro-pneumatic controller operatively coupled to a regulator is disclosed. The electro-pneumatic controller includes a base having a top surface and a bore disposed within the base, and the method includes disposing a locking mechanism within a bore of the base until a top surface of the locking mechanism is flush with the top surface of the base. The method further includes securing an annular rim of an open end of a cover to the base, the annular rim contacting the top surface of the base and a portion of the top surface of the lock screw, and rotating the locking mechanism in a counter-clockwise direction until a portion of the locking mechanism one or more of jars or pinches against the rim of the cover to lock the cover to the base.

In further accordance with any one or more of the exemplary aspects, an electro-pneumatic controller and/or a process control system of this disclosure may include any one or more of the following further preferred forms.

In some preferred forms, the locking mechanism may include an annular collar or head including the top surface, a bottom surface, and an aperture disposed within a center of the annular collar on the top surface. The aperture is adapted to receive a tool for rotating the locking mechanism. In addition, the locking mechanism may further include a cylindrical post downwardly extending from the bottom surface of the annular collar, the cylindrical post having an outside surface with at least one thread. The bore may include an inside surface having at least one thread that engages the at least one thread disposed on the outside surface of the locking mechanism to secure the locking mechanism to the bore.

In some preferred forms, the bore of the body of the base may include an upper section having a first diameter and a lower section having a second diameter, with the first diameter being greater than the second diameter. In addition, the upper section may be adapted to receive the annular collar of the locking mechanism and the lower section may be adapted to receive the cylindrical post. In addition, the locking mechanism may further include a bottom surface and a cylindrical post downwardly extending from the bottom surface, the cylindrical post having at least one thread, and the bore of the body of the base including at least one thread, wherein the at least one thread of the cylindrical post of the locking mechanism and the at least one thread of the bore of the body of the base engage each other to secure the locking mechanism within the bore.

In some preferred forms, the base may include an annular projection upwardly extending from the top surface of the base, and the annular projection may have an outside surface with a plurality of threads. In addition, the cover may include an inside surface having a plurality of threads adapted to engage the plurality of threads disposed on the outside surface of the annular projection of the base to secure the cover to the base. The locking mechanism may include one or more of a lock screw, a countersink screw, a flush mount screw, or a reverse thread screw. In addition, the locking mechanism may be a one-piece lock arranged to lock the cover to the base with a single tool adapted to be inserted within one of an aperture or socket disposed within the top surface of the locking mechanism.

In yet some other preferred forms, the cover may include an elongate body extending from the open end to a closed end, and the cover may be adapted to enclose components of the controller. In addition, the top surface of the annular collar may have a mid-point extending radially around the annular collar, and the rim of the cover may contact a portion of the annular collar one of over, before or at the mid-point of the annular collar.

Additional optional aspects and features are disclosed, which may be arranged in any functionally appropriate manner, either alone or in any functionally viable combination, consistent with the teachings of the disclosure. Other aspects and advantages will become apparent upon consideration of the following detailed description.

DETAILED DESCRIPTION OF THE DISCLOSURE

Generally, a single piece or one-piece locking mechanism for a cover of an electro-pneumatic controller for use with a regulator is disclosed. The electro-pneumatic controller includes a base having a body, a top surface, and a bore formed within the body. The single piece locking mechanism is disposed within the bore of the base and includes a top surface that is flush with the top surface of the base. A cover is coupled to base and includes an open end with a rim. The rim contacts the top surface of the base and a portion of the top surface of the locking mechanism. The locking mechanism is rotated upwardly and in a counter-clockwise direction by a single tool, such as an Allen wrench, to lock the cover to the base.

Figure 2:
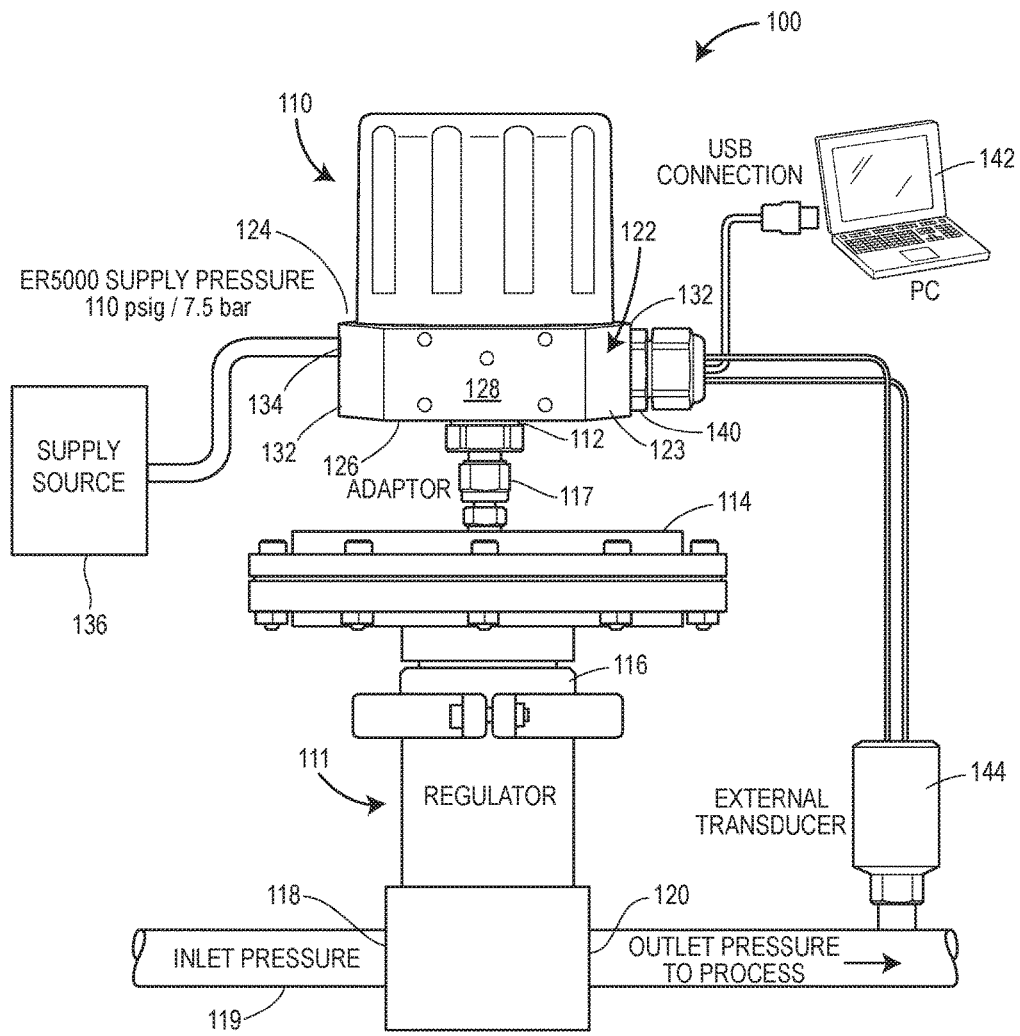
FIG. 2 is a schematic view of a process control system including an electro-pneumatic controller of the present disclosure.

Referring now to FIG. 2, a process control system 100 includes an electro-pneumatic controller 110 that is operatively coupled to a regulator 111. More specifically, an outlet port 112 of the electro-pneumatic controller 110 is operatively coupled to a top portion 114 of a housing 116 of the regulator 111 via an adaptor 117, for example. The regulator 111 includes an inlet 118 for receiving inlet pressure in a pressure line 119, and an outlet 120 for directing outlet pressure downstream the regulator 111 in the process line 119.

The electro-pneumatic controller 110 includes a base 122 having a body 123 with a top surface 124, a bottom surface 126, a front portion 128, a rear portion 130 (FIG. 3), and a pair of side walls 132 extending from the front portion 128 to the rear portion 130 of the body 123. One side wall 132 of the pair of side walls 132 includes a supply port 134 for receiving supply pressure from an external source, such as supply source 136. In one example, a supply pressure of up to 120 psig/8.2 bar, with 110 psig/7.5 bar being typical, is provided. The other side wall 132 includes two conduit connections, a first conduit connection 140 for USB wiring and a second conduit (not shown) connection for internal wiring.

As further depicted in FIG. 2, a computer 142 may be communicatively coupled to the electro-pneumatic controller 110 via the first conduit connection 140 for USB wiring. A transducer 144 may be disposed downstream the outlet 120 of the regulator 111 and may be communicatively coupled to the electro-pneumatic controller 110. In one example, the electro-pneumatic controller 110 senses system pressure through input, e.g., a feedback signal, from the transducer 144, for example. The electro-pneumatic controller 110 reads the input and compares it to a setpoint pressure, which the electro-pneumatic controller 110 may receive from an external source, such as the computer 142, or from a profile on its onboard memory, for example.

Figure 3:
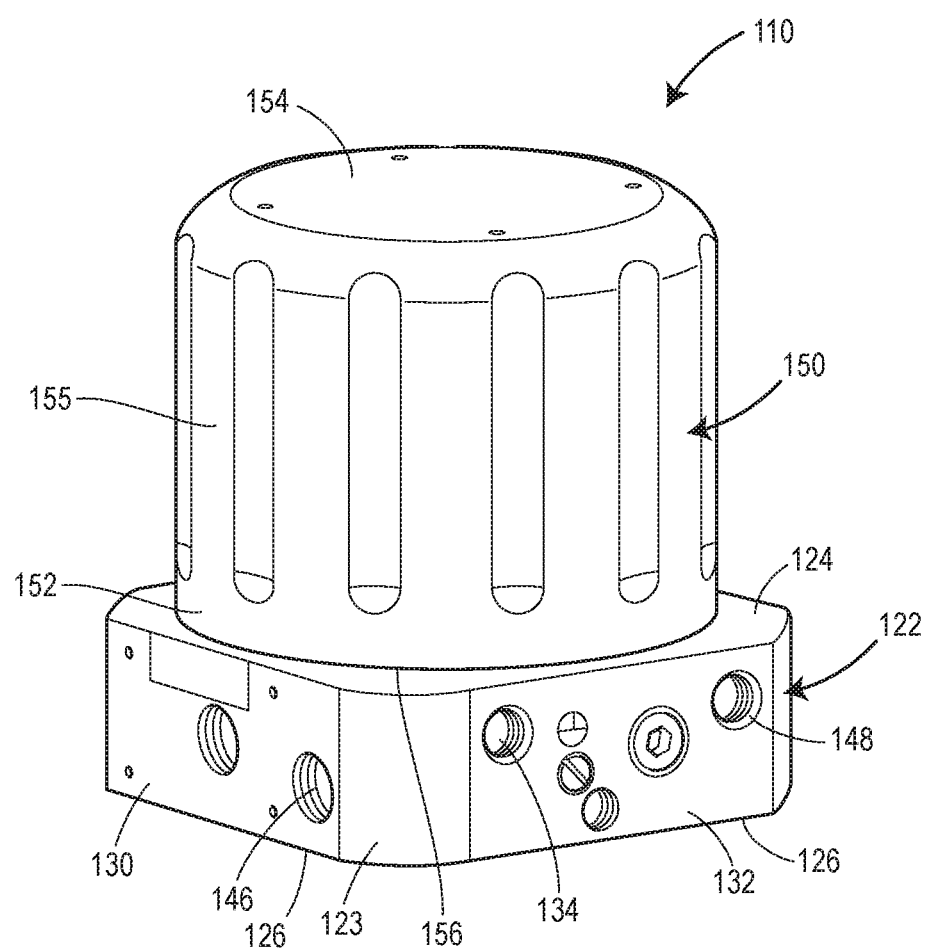
FIG. 3 is a side perspective view of the electro-pneumatic controller of the present disclosure.
Figure 4:
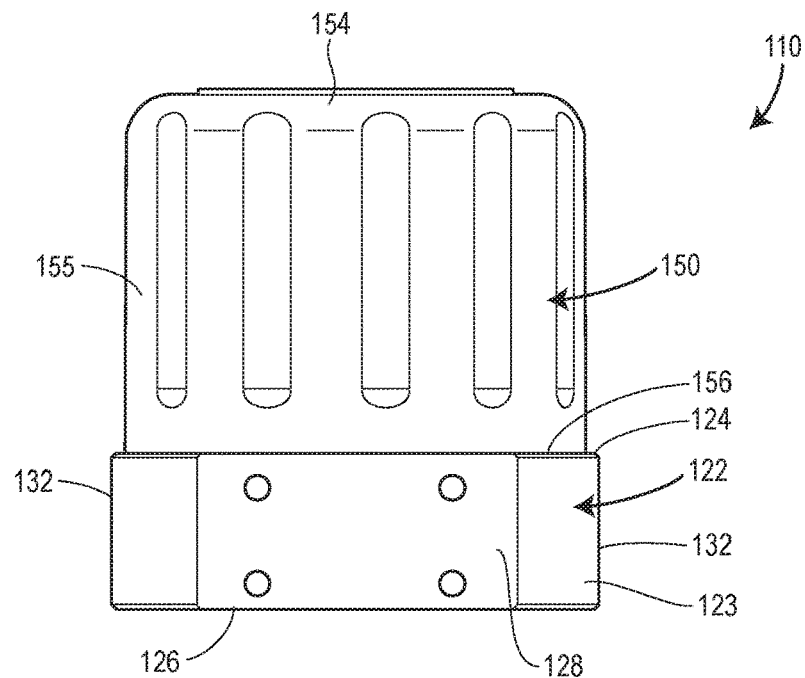
FIG. 4 is a perspective view of the electro-pneumatic controller of the present disclosure.

More specifically, and referring now to FIGS. 3 and 4, the rear end 130 of the body 124 of the base 122 includes a gauge port 146, and the side wall 132 includes an exhaust port 148, in addition to the supply port 134. The electro-pneumatic controller 110 also includes a cover 150 that is coupled to the base 122. The cover 150 includes an open end 152, a closed end 154 disposed opposite the open end 152, and an elongate body 155 extending from the open end 152 to the closed end 154. The open end 152 further includes a rim 156 that contacts the top surface 124 of the base 122.

Figure 5:
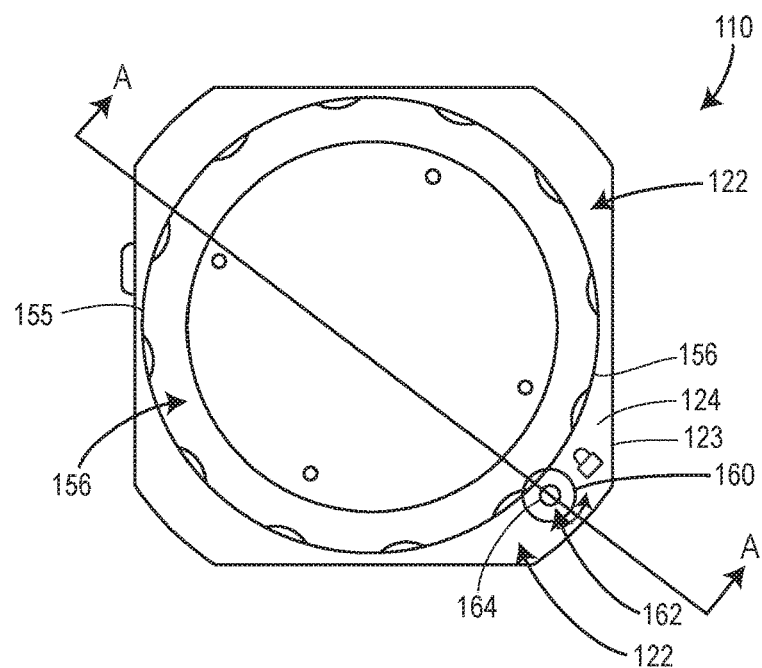
FIG. 5 is a top view of the electro-pneumatic controller of FIG. 4.
Figure 9:
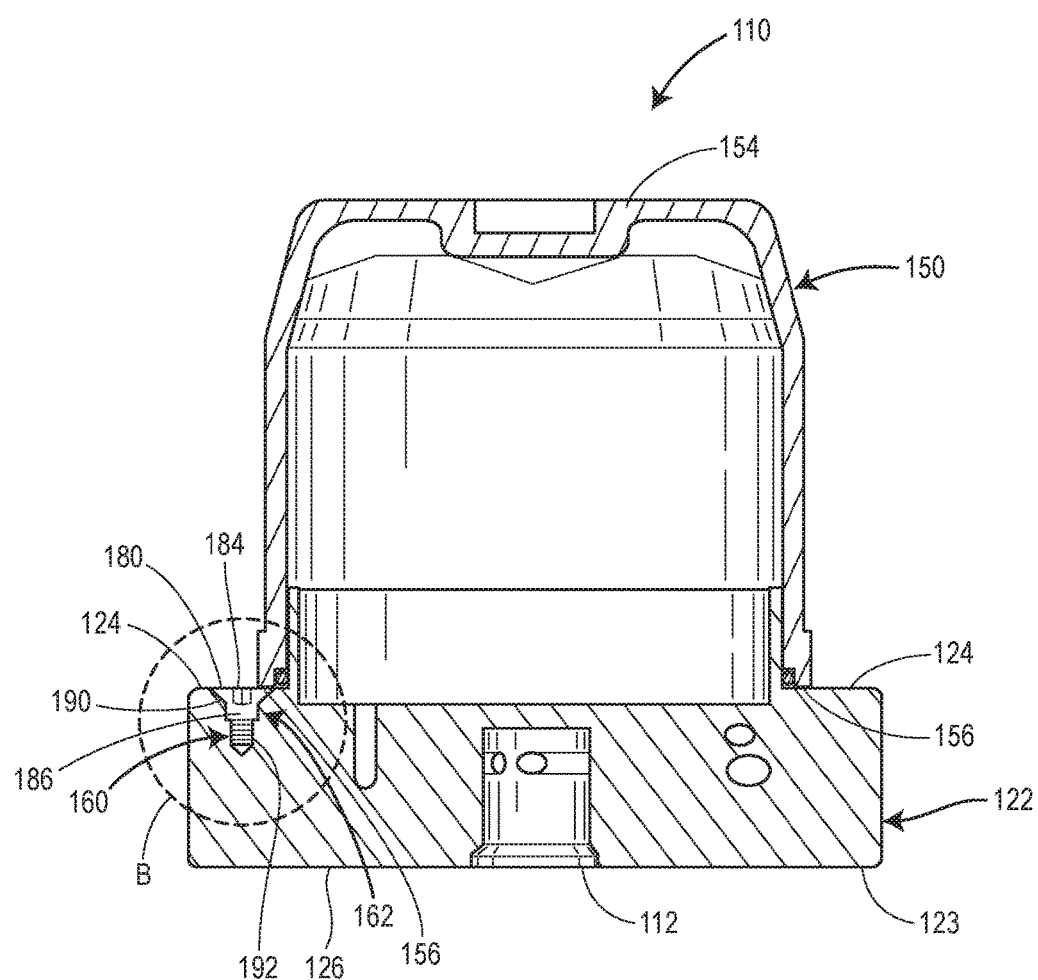
FIG. 9 is a sectional view of the electro-pneumatic controller of the present disclosure taken along the line A-A of FIG. 5.
Figure 10:
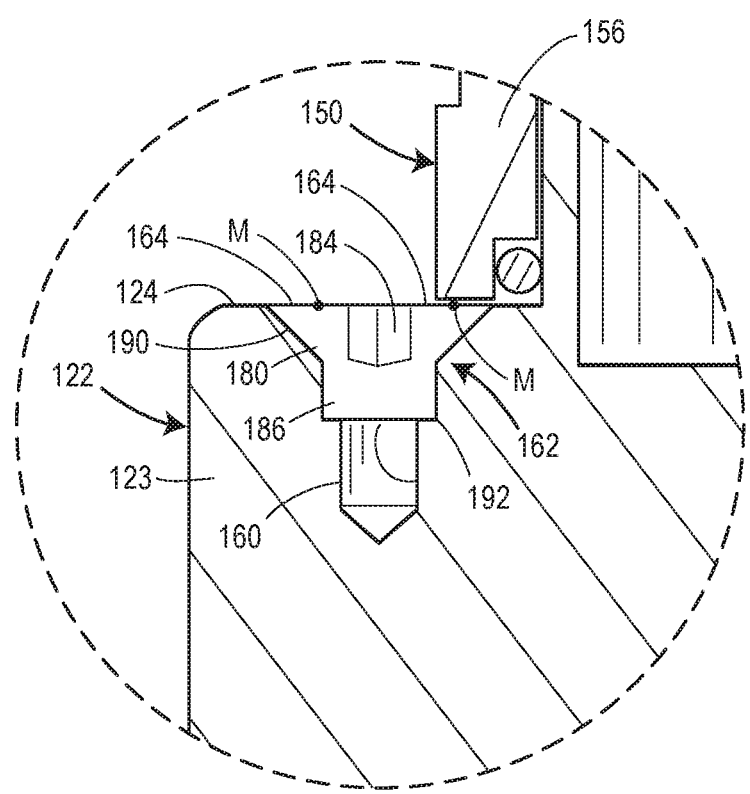
FIG. 10 is a close-up view of area B of FIG. 9.

As depicted, for example, in FIG. 5, a bore 160 is formed within the body 123 of the base 122 in the top surface 124 of the base 122. A locking mechanism 162 is disposed within the bore 160 of the base 122. The locking mechanism 162 includes a top surface 164 that is flush with the top surface 124 of the base 122, as also depicted in FIGS. 9 and 10, for example. In other words, the top surface 164 of the locking mechanism 162 is disposed at the same level and/or the same height as the top surface 124 of the base 122, creating a smooth surface along the top surface 124 of the base 122.

When the cover 150 is coupled to the base 122, the rim 156 also contacts a portion of the top surface 164 of the locking mechanism 162 in addition to the top surface 124 of the base 122, as depicted, for example, in FIG. 5. After the cover 150 contacts a portion of the top surface 162 of the locking mechanism 162, the locking mechanism 162 is rotated upwardly and/or in a counter-clockwise direction via a single tool, such as an Allen wrench. As a result, the top surface 164 of the locking mechanism 162 backs up and into the rim 156 and jars and/or pinches the locking mechanism 162 into the cover 150, forming a lock between the cover 150 and the base 122 of the electro-pneumatic controller 110.

Figure 6:
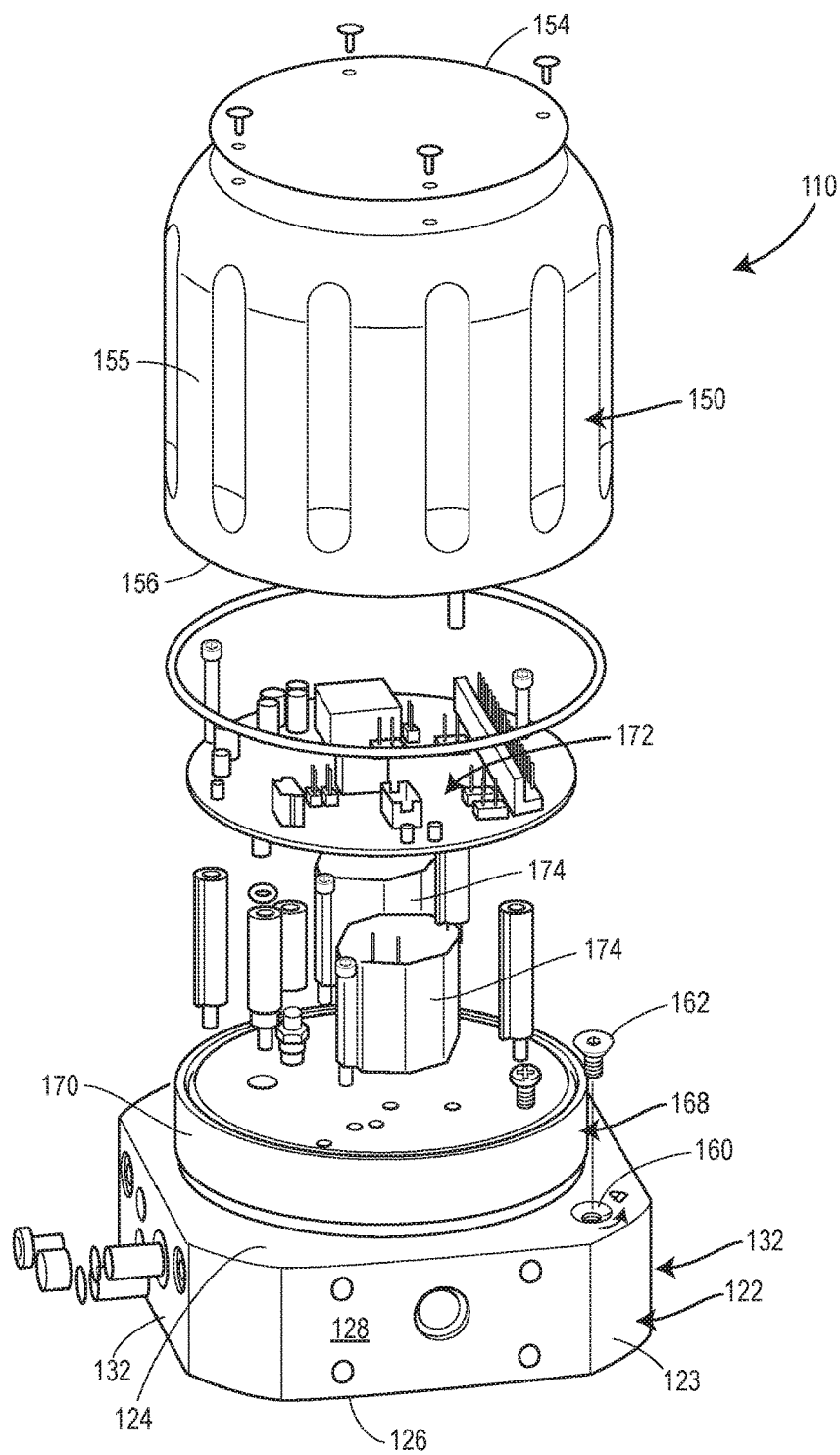
FIG. 6 is an exploded perspective view of the electro-pneumatic controller of the present disclosure.

Referring now to FIG. 6, an exploded view of the electro-pneumatic controller 110 of the present disclosure is depicted. The base 122 further includes an annular projection 168 that upwardly extends from the top surface 124 of the base 122. The annular projection 168 further includes an outside surface 170 having at least one thread or a plurality of threads. The cover 150 likewise includes an inside surface (not shown) also having at least one thread or a plurality of threads. When the cover 150 is coupled to the base 122, the threads on the inside surface of the cover 150 engage the threads on the outside surface 170 of the annular projection 168 to secure the cover 150 to the base 122.

As further depicted in FIG. 6, the annular projection 168 has a hollow interior and receives circuitry 172, one or more valves 174, such as a solenoid valve and/or an inlet valve and an exhaust valve, and other components of the electro-pneumatic controller 110. The cover 150 encloses at least the circuitry 172, the one or more valves 174 and other components of the electro-pneumatic controller 110 when the cover 150 is disposed on the top surface 124 of the base 122, for example.

In operation, and as noted, the electro-pneumatic controller 110 senses system pressure through input, e.g., a feedback signal, of the transducer 144 (FIG. 2) that is mounted downstream the outlet 120 in the process line 119 (FIG. 2). If the feedback signal is lower than a programmed setpoint, the electro-pneumatic controller 110 activates one valve 174, such as an inlet valve, allowing pressure to flow into the regulator 111. This causes a main valve (not shown) of the regulator 111 to open up, resulting in an increase in downstream system pressure. The electro-pneumatic controller 110 continues to send pressure into the regulator 111 until sensed feedback from the transducer 144, for example, is equal to the setpoint pressure. At that point, the valve 174, such as the inlet valve, is closed, stabilizing the system at that pressure.

If, however, the feedback signal from the transducer 144, for example, sensed by the electro-pneumatic controller 110 is higher than the setpoint pressure, the electro-pneumatic controller 110 activates another valve 174, such as an exhaust valve, to release pressure from the regulator 111. The result is a decrease in downstream system pressure. The electro-pneumatic controller 110 continues to exhaust the pressure until the feedback signal received is equal to the setpoint. At that point, the exhaust valve 174 closes, stabilizing the system at that pressure.

Figure 7:
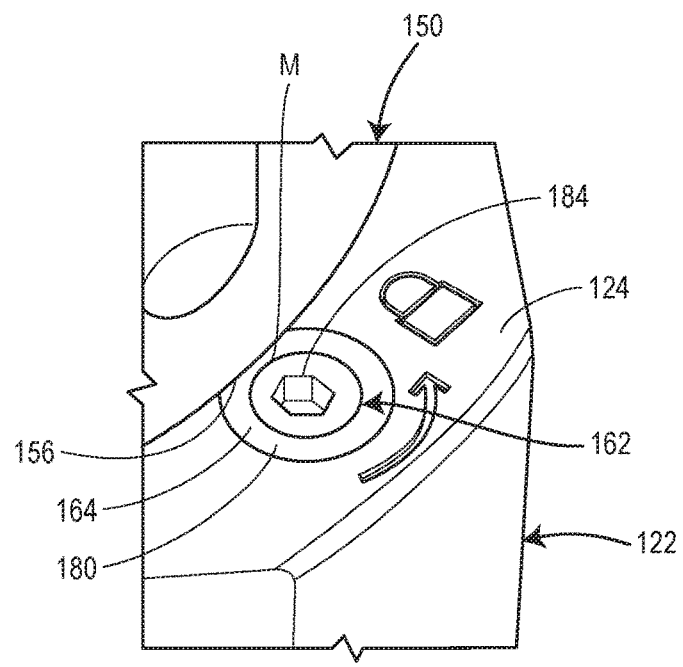
FIG. 7 is a close-up perspective view of a locking mechanism of the electro-pneumatic controller of the present disclosure.
Figure 8:
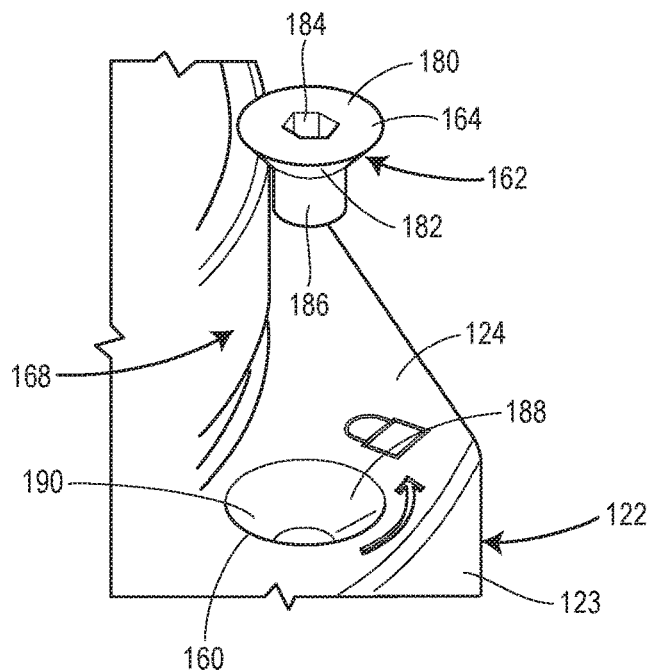
FIG. 8 is an exploded view of the locking mechanism of the electro-pneumatic controller of the present disclosure.

Referring now to FIGS. 7 and 8, the locking mechanism 162 includes an annular collar 180 having the top surface 164, a bottom surface 182 (FIG. 8), and an aperture 184, such as a socket. In one example, the top surface 164 is flat, and the bottom surface 182 slopes downwardly and inwardly toward a center of the annular collar 180. In addition, the aperture 184 is disposed within a center of the annular collar 180 on the top surface 164 of the locking mechanism 162. The aperture 184 receives a tool, such as an Allen wrench, for rotating the locking mechanism 162. The annular collar 180 may further include at least one thread or a plurality of threads (not shown). The locking mechanism 162 further includes a cylindrical post 186 that downwardly extends from the bottom surface 182 of the annular collar 180. In one example, the cylindrical post 186 includes an outside surface having one or more of at least one thread or a plurality of threads. The one or more threads of one or both of the annular collar 180 and the cylindrical post 186 of the locking mechanism 162 are along the same axis as and parallel to the one or more threads of the inside surface of the cover 150.

The bore 160 includes an inside surface 188 for receiving the annular collar 180 of the locking mechanism 162, for example. In one example, the inside surface 188 includes one of at least one thread or a plurality of threads that engage the at least one thread or the plurality of threads disposed on the annular collar 180 of the locking mechanism 162. In addition, the inside surface 188 of the bore 160 may also slope inwardly and downwardly toward the center of the bore 160, forming a dome-shaped portion that matches the shape of the bottom surface 182 of the annular collar 180 of the locking mechanism 162.

As depicted in FIG. 9, the bore 160 of the body 123 of the base 122 includes an upper section 190 having a first diameter D1 and a lower section 192 having a second diameter D2. In one example, the first diameter D1 is greater than the second diameter D2. The upper section 190 receives the annular collar 180 of the locking mechanism 162 and the lower section 192 receives the cylindrical post 186.

In yet another example, and as depicted in FIGS. 7 and 10, the top surface 164 of the annular collar 180 has a mid-point M, which may extend radially around the annular collar 180. When the rim 156 of the cover 150 contacts a portion of the annular collar 180, the rim 156 may contact the top surface 164 of the locking mechanism 162 one or more of over, before, or at the mid-point M of the annular collar 180, such that the aperture 184 disposed within the top surface 164 of the locking mechanism 162 is not enclosed by the cover 150. Said another way, while the rim 156 may contact the top surface 164 one or more of over, before, or at the mid-point M of the annular collar 180, the aperture 184 of the locking mechanism 162 is always exposed. Thus, a tool may always be inserted into the aperture 184 to rotate the locking mechanism 162.

More specifically, in one example, the rim 156 of the cover 150 contacts a portion of the annular collar 180 before the mid-point M of the annular collar 180, as depicted in FIG. 7. In another example, and as depicted in FIG. 10, the rim 156 of the cover 150 contacts the portion of the top surface 164 of the annular collar 180 beyond the mid-point M of the annular collar 180. In either example, the aperture 184 of the locking mechanism 162 is not in contact with any portion of the rim 156 of the cover 150 or any part of the cover 150, allowing the aperture 184 to be completely exposed to the atmosphere. Said another way, the aperture 184 of the locking mechanism 162 is not enclosed by any part of the cover 150.

While the locking mechanism 162 includes the annular collar 180 and the cylindrical post 186, as described in detail above, one of ordinary skill in the art will appreciate that the locking mechanism 162 may alternatively include various other shapes and configurations and still fall within the scope of the present disclosure. For example, the locking mechanism 162 may include one or more of a lock screw, a countersink screw, a flush mount screw, or a reverse thread screw and still fall within the scope of the present disclosure. More specifically, each of the lock screw, the countersink screw, the flush mount screw and the reverse thread screw may include one or more of the components described above relative to the locking mechanism 162, and generally may include a head and a post extending from the head.

In view of the foregoing, one of ordinary skill in the art will appreciate the following example method of locking the cover 150 of the electro-pneumatic controller 110 for use with the regulator 111. More specifically, the method for locking the cover 150 of the electro-pneumatic controller 110 includes disposing the locking mechanism 162 within the bore 160 of the base 122 until the top surface 164 of the locking mechanism 162 is flush with the top surface 124 of the base 122. The method further includes securing the annular rim 156 of the open end of the cover 150 to the base 122, the annular rim 156 contacting the top surface 124 of the base 122 and a portion of the top surface 164 of the locking mechanism 162. The method still further includes rotating the locking mechanism 162 in a counter-clockwise direction until a portion of the locking mechanism 162 one or more of jars or pinches against the rim 156 of the cover 150 to lock the cover 150 to the base 122.

In addition, and in one example, disposing the locking mechanism 162 within the bore 160 of the base 122 comprises engaging at least one thread or threads disposed on an outside surface of the post 186 of the locking mechanism 162 with at least one thread or threads disposed on an inside surface of the bore 160 of the base 122 until the top surface 164 of the locking mechanism 162 is flush with, e.g., level with and/or at the same height as, the top surface 124 of the base 122. In another example, disposing the locking mechanism 162 within the bore 160 of the base 122 comprises rotating the locking mechanism 162 in a clockwise direction until the top surface 164 of the locking mechanism 162 is flush with the top surface 124 of the base 122.

Further, and in another example, securing the annular rim 156 of the cover 150 to the base 122 comprises engaging at least one thread or threads disposed on an inside surface of the annular rim 156 with at least one thread or threads disposed on an outside surface 170 of the annular projection 168 extending from the top surface 124 of the base 122.

In yet another example, rotating the locking mechanism 162 in a counter-clockwise direction until a portion of the locking mechanism 162 one or more of jars or pinches against the rim 156 of the cover 150 to lock the cover 150 to the base 122 comprises rotating the locking mechanism 162 upwardly via one or more of a tool (not shown), such as an Allen wrench. In one example, the locking mechanism 162 is rotated by the tool only one-half of a counter-clockwise turn until the top surface 164 of the locking mechanism 162 one or more of jars or pinches against the rim 156 of the cover 150 to lock the cover 150 to the base 122. In another example, the locking mechanism 162 is rotated by the tool a full counter-clockwise turn until the top surface 164 of the locking mechanism 162 one or more of jars or pinches against the rim 156 of the cover 150 to lock the cover 150 to the base 122. In either example, rotating the locking mechanism 162 to lock the cover 150 to the base 122 is a simple and efficient process.

Figure 1:
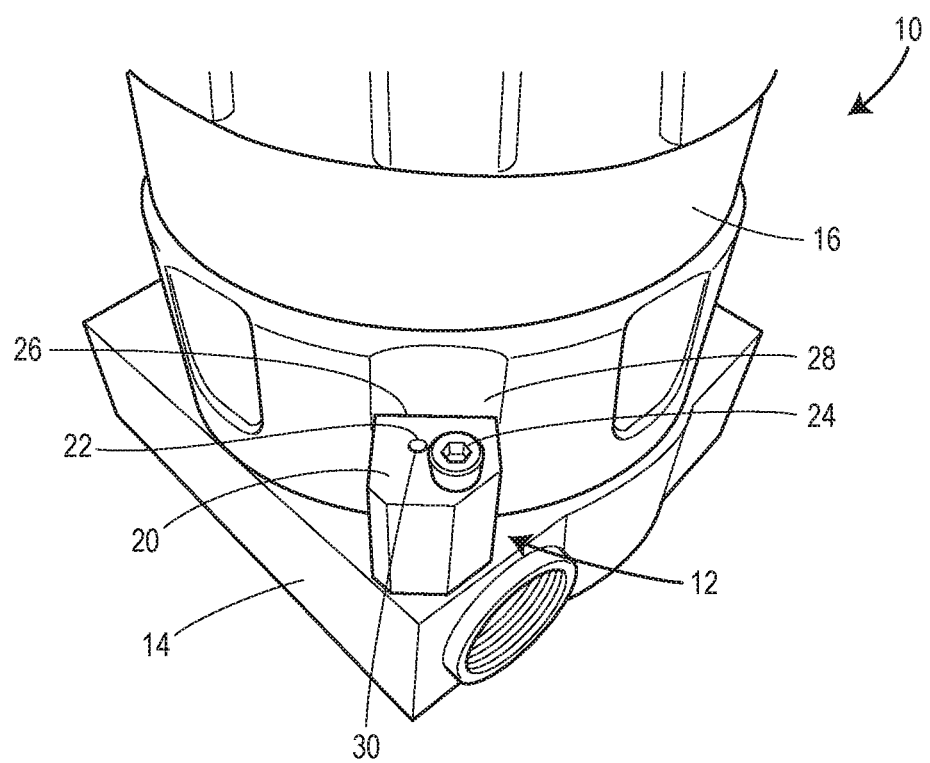
FIG. 1 is a perspective view of a conventional lock assembly for a cover of an electro-pneumatic controller.

Overall, one of ordinary skill in the art will appreciate the various advantages of the locking mechanism 162 and method of locking a cover of an electro-pneumatic controller 110. For example, the locking mechanism 162 is a one-piece or single-piece commercially available part, such as a countersink screw, a reverse thread screw and/or an allen-screw, as opposed to the three-part or multi-part locking assemblies used with conventional electro-pneumatic controllers 110 (see, e.g., FIG. 1). As a result, because there is only one part of the locking mechanism 162 to install in the base 122, for example, installation errors are reduced, increasing the effectiveness of the lock, and ultimately reducing the risk of damage and/or injury. In addition, the one-piece locking mechanism 162 is easy to install and not cumbersome, and creates a dependable, smooth flush lock for the cover 150 of the electro-pneumatic controller 110. Still further, the locking mechanism and method of the present disclose does not require an alignment with the cover 150 of the electro-pneumatic controller 110 during installation, further reducing the risk of installation errors, and ultimately damage and/or injury due to any such errors. The one-piece locking mechanism and method are, thus, more efficient to assemble and install and, therefore, also less expensive.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one example" or "an example" means that a particular element, feature, structure, or characteristic described in connection with the embodiment is included in at least one embodiment. The appearances of the phrase "in one example" in various places in the specification are not necessarily all referring to the same example.

Some examples may be described using the expression "coupled" and "connected" along with their derivatives. For example, some examples may be described using the term "coupled" to indicate that two or more elements are in direct physical or electrical contact. The term "coupled," however, may also mean that two or more elements are not in direct contact with each other, but yet still cooperate or interact with each other. The examples are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. An electro-pneumatic controller for use with a regulator, the electro-pneumatic controller comprising:
    a base having a body, a top surface, and a bore formed within the body;
    a locking mechanism disposed within the bore of the base, the locking mechanism having a top surface flush with the top surface of the base; and
    a cover coupled to the base, the cover having an open end with a rim, the rim contacting the top surface of the base and a portion of the top surface of the locking mechanism,
    where the locking mechanism is arranged to rotate in a counter-clockwise direction after the cover contacts a portion of the top surface of the locking mechanism to lock the cover to the base, and
    where the cover including an elongate body extending from the open end to a closed end, the cover adapted to enclose components of the controller.

2. The electro-pneumatic controller of claim 1, the locking mechanism further comprising an annular collar including the top surface, a bottom surface, and an aperture disposed within a center of the annular collar on the top surface, the aperture adapted to receive a tool for rotating the locking mechanism.

3. The electro-pneumatic controller of claim 2, the locking mechanism further comprising a cylindrical post downwardly extending from the bottom surface of the annular collar, the cylindrical post having an outside surface with at least one thread, and the bore further comprising an inside surface having at least one thread that engages the at least one thread disposed on the outside surface of the locking mechanism to secure the locking mechanism to the bore.

4. The electro-pneumatic controller of claim 1, wherein the bore of the body of the base includes an upper section having a first diameter and a lower section having a second diameter, the first diameter greater than the second diameter, the upper section adapted to receive an annular collar of the locking mechanism and the lower section adapted to receive a cylindrical post.

5. The electro-pneumatic controller of claim 1, the locking mechanism further including a bottom surface and a cylindrical post downwardly extending from the bottom surface, the cylindrical post having at least one thread, and the bore of the body of the base including at least one thread, wherein the at least one thread of the cylindrical post of the locking mechanism and the at least one thread of the bore of the body of the base engage each other to secure the locking mechanism within the bore.

6. The electro-pneumatic controller of claim 1, the base further including an annular projection upwardly extending from the top surface of the base, the annular projection having an outside surface with a plurality of threads, and the cover including an inside surface having a plurality of threads adapted to engage the plurality of threads disposed on the outside surface of the annular projection of the base to secure the cover to the base.

7. The electro-pneumatic controller of claim 1, the locking mechanism including one or more of a lock screw, a countersink screw, a flush mount screw, or a reverse thread screw.

8. The electro-pneumatic controller of claim 1, wherein the locking mechanism is a one-piece lock arranged to lock the cover to the base with a single tool adapted to be inserted within one of an aperture or socket disposed within the top surface of the locking mechanism.

9. The electro-pneumatic controller of claim 2, the top surface of the annular collar having a mid-point extending radially around the annular collar, the rim of the cover contacting a portion of the annular collar one of over, before or at the mid-point of the annular collar, such that an aperture disposed within the top surface of the locking mechanism is not enclosed by the cover.

10. A process control system comprising:
    a regulator having a housing with a top portion;
    an electro-pneumatic controller having an outlet port operatively coupled to the top portion of the regulator housing, the electro-pneumatic controller to maintain a setpoint pressure within the regulator, the electro-pneumatic controller comprising:
    a base having a body, a top surface, a bottom surface, and a bore formed within the body, the outlet port formed in the bottom surface of the base;
    a locking mechanism disposed within the bore of the base, the locking mechanism having a top surface flush with the top surface of the base; and
    a cover coupled to the base, the cover having an open end with a rim, the rim contacting the top surface of the base and a portion of the top surface of the locking mechanism,
    where the locking mechanism is arranged to rotate upwardly in a counter-clockwise direction after the cover contacts a portion of the top surface of the locking mechanism to lock the cover to the base.

11. The process control system of claim 10, wherein the locking mechanism further includes an annular collar including the top surface, the bottom surface, and an aperture disposed within a center of the annular collar on the top surface, the aperture adapted to receive a tool for rotating the locking mechanism.

12. The process control system of claim 10, wherein the locking mechanism further includes a cylindrical post downwardly extending from the bottom surface, the cylindrical post having at least one thread, and the bore of the body of the base includes at least one thread, the at least one thread of the cylindrical post of the locking mechanism and the at least one thread of the bore of the body of the base engage each other to secure the locking mechanism within the bore of the body of the base.

13. The process control system of claim 10, the base further including an annular projection upwardly extending from the top surface of the base, the annular projection having an outside surface with a plurality of threads, and the cover further including an inside surface having a plurality of threads adapted to engage the plurality of threads disposed on the outside surface of the annular projection of the base to secure the cover to the base.

14. The process control system of claim 11, the top surface of the annular collar of the locking mechanism having a mid-point extending radially around the annular collar, the rim of the cover contacting a portion of the annular collar one or more of over, before, or at the midpoint of the annular collar, the aperture disposed within the top surface of the locking mechanism is not enclosed by the cover.

15. The process control system of claim 10, further comprising a transducer disposed downstream an outlet of the regulator, the transducer communicatively coupled to the electro-pneumatic controller, the electro-pneumatic controller to sense outlet pressure from a feedback signal from the transducer.

16. A method for locking a cover of an electro-pneumatic controller operatively coupled to a regulator, the electro-pneumatic controller comprising a base having a top surface and a bore disposed within the base, the method comprising:
   disposing a locking mechanism within a bore of the base until a top surface of the locking mechanism is flush with the top surface of the base;
   securing an annular rim of an open end of a cover to the base, the annular rim contacting the top surface of the base and a portion of the top surface of the lock screw; and
   rotating the locking mechanism in a counter-clockwise direction until a portion of the locking mechanism one or more of jars or pinches against the rim of the cover to lock the cover to the base.

17. The method of claim 16, wherein disposing a locking mechanism within a bore of the base comprises engaging threads disposed on an outside surface of a post of the locking mechanism with threads disposed on an inside surface of the bore of the base until the top surface of the locking mechanism is flush with the top surface of the base.

18. The method of claim 16, wherein securing an annular rim of an open end of a cover to the base comprises engaging threads disposed on an inside surface of the annular rim with threads disposed on an outside surface of an annular projection extending from the top surface of the base.

19. The method of claim 16, wherein rotating the locking mechanism in a counter-clockwise direction until a portion of the locking mechanism one or more of jars or pinches against the rim of the cover to lock the cover to the base comprises rotating the locking mechanism upwardly via one or more of one tool or an Allen wrench one of a half counter-clockwise turn or a full counter-clockwise turn until the top surface of the locking mechanism jars the rim of the cover.

* * * * *

UNITED STATES PATENT AND TRADEMARK OFFICE
CERTIFICATE OF CORRECTION

PATENT NO. : 10,240,623 B2
APPLICATION NO. : 15/187455
DATED : March 26, 2019
INVENTOR(S) : Jacob T. R. Renollett et al.

It is certified that error appears in the above-identified patent and that said Letters Patent is hereby corrected as shown below:

In the Specification

At Column 1, Line 61, "locking assembly 16," should be -- locking assembly 12, --.

At Column 1, Line 67, "locking assembly 16," should be -- locking assembly 12, --.

At Column 4, Line 56, "body 124" should be -- body 123 --.

At Column 8, Line 19, "disclose" should be -- disclosure --.

Signed and Sealed this
Third Day of November, 2020

Andrei Iancu
*Director of the United States Patent and Trademark Office*